April 8, 1958 — S. INNOCENTI — 2,829,692
TOBACCO CUTTER HAVING CONTINUOUSLY ADJUSTED CUTTER HEAD
Filed Aug. 7, 1956 — 7 Sheets-Sheet 1

INVENTOR
SCIPIONE INNOCENTI
BY
ATTORNEY

April 8, 1958  S. INNOCENTI  2,829,692
TOBACCO CUTTER HAVING CONTINUOUSLY ADJUSTED CUTTER HEAD
Filed Aug. 7, 1956  7 Sheets-Sheet 2

INVENTOR
*Scipione Innocenti*

BY
ATTORNEY

April 8, 1958 S. INNOCENTI 2,829,692
TOBACCO CUTTER HAVING CONTINUOUSLY ADJUSTED CUTTER HEAD
Filed Aug. 7, 1956 7 Sheets-Sheet 5

Fig. 7

INVENTOR
*Scipione Innocenti*
BY
ATTORNEY

Fig. 8

INVENTOR
Scipione Innocenti

United States Patent Office

2,829,692
Patented Apr. 8, 1958

2,829,692

TOBACCO CUTTER HAVING CONTINUOUSLY ADJUSTED CUTTER HEAD

Scipione Innocenti, Bologna, Italy, assignor to S. A. S. I. B.-S. p. A. Scipione Innocenti-Bologna, Bologna, Italy, an Italian joint-stock company Application August 7, 1956, Serial No. 602,658

Claims priority, application Italy August 11, 1955

11 Claims. (Cl. 146—119)

In conventional leaf tobacco-shredding or cutting machines provided with a rotary cutter head, the leaf tobacco is continuously fed to and through a mouthpiece, tangentially to the path of the knives or longitudinal cutters carried by said rotary cutter head. As, however, in these machines, the knife edges after each cut, in their path, pass an adjoining grinding wheel (the term "wheel" including also the meaning of "cylinder"), due to the wear of the knives because of their continuous sharpening, means must be provided for maintaining the right cutting spacing between the knife edges and said mouthpiece. This may be done either by mounting said knives slidable within the head and under the action of means for pushing the same out to compensate for their wear or, if the knives are firmly clamped to the head, means must be provided for continuously moving the grinding wheel towards the cutter head and this latter towards the tobacco discharge mouthpiece.

The object of the invention is to provide, in a leaf tobacco-shredding machine of the kind last-specified, a device which automatically adjusts the distances of the rotary cutter head and of its grinding wheel between them and with respect to said tobacco discharge mouthpiece, said device comprising a mechanism which promotes a slow advancing of the cutter head towards the leaf discharge tobacco mouthpiece in proximity of which an electric contact is so arranged as to be slightly touched by the knives of the revolving cutter head, when said knives pass in close proximity of said mouthpiece. Said contact forms part of a control circuit which declutches the advancing or feed device of the cutter head towards the said mouthpiece as soon as one of the cutter head knives slightly touches said insulated contact and subsequently automatically again clutches the said feed device with a predetermined delay which corresponds at least to one complete revolution of the rotary cutter head.

Thus the automatic advancing of the cutter head towards said mouthpiece takes place intermittently, every time by a micrometric distance which is however sufficient to cause the revolving knives to slightly sweep said insulated contact fitted in proximity of said tobacco discharge mouthpiece.

The above and other features of the invention will appear from the following specification of a preferred embodiment which is shown by way of non-limiting example on the annexed drawings, in which.

Figure 1:
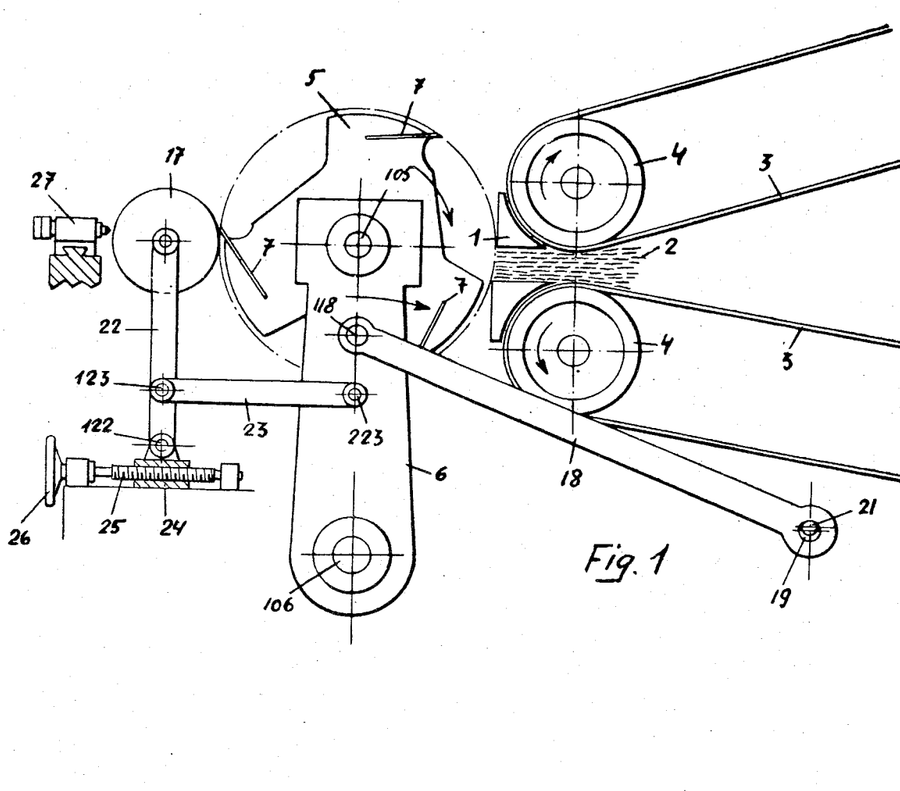
Figure 1 diagrammatically shows a first embodiment of cutting unit of a leaf tobacco-shredding machine, provided with means for advancing the grinding wheel towards the cutter head to compensate for the knives wear.
Figures 2, 3:
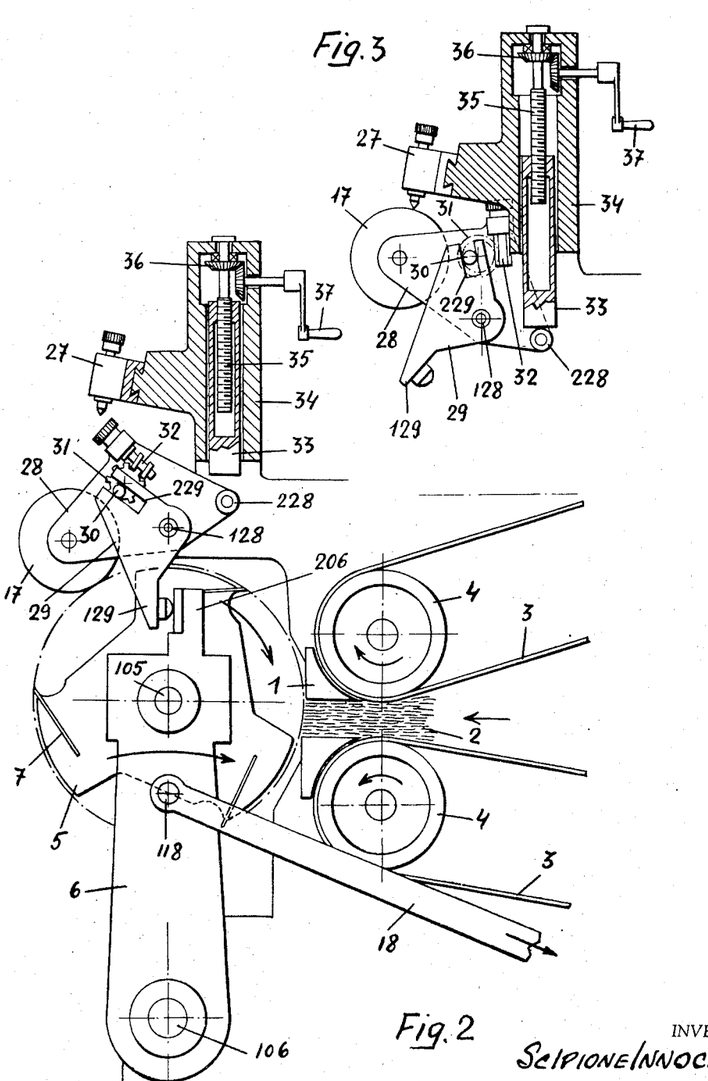
Figure 2 diagrammatically shows a second embodiment of the grinding wheel advancing device.
Figure 3 shows a detail of Figure 2, with the grinding wheel in diamond-dressing position.

With reference to the drawings, specifically to Figs. 1 and 2, a typical tobacco shredding machine comprises a tobacco discharge mouthpiece 1 to which the tobacco 2 is delivered in compressed condition by a pair of converging endless conveyor belts 3 which run on spaced pairs of rollers of which only the front rollers 4 of each pair are shown.

Figure 6:
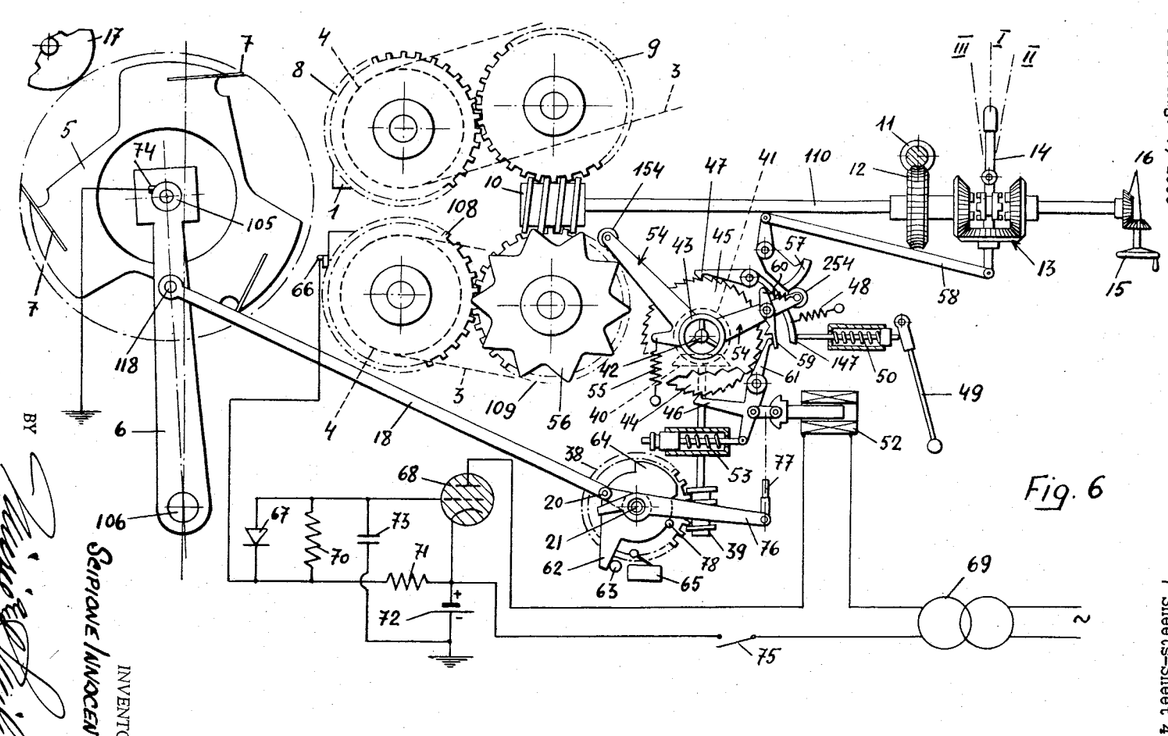
Figure 6 diagrammatically shows a device and electric control circuit for the continuous automatic adjusting of the cutter head, with respect to the leaf tobacco discharge mouthpiece; and parts being in the position of maximum spacing of the cutter head from the leaf tobacco discharge mouthpiece.
Figure 7:
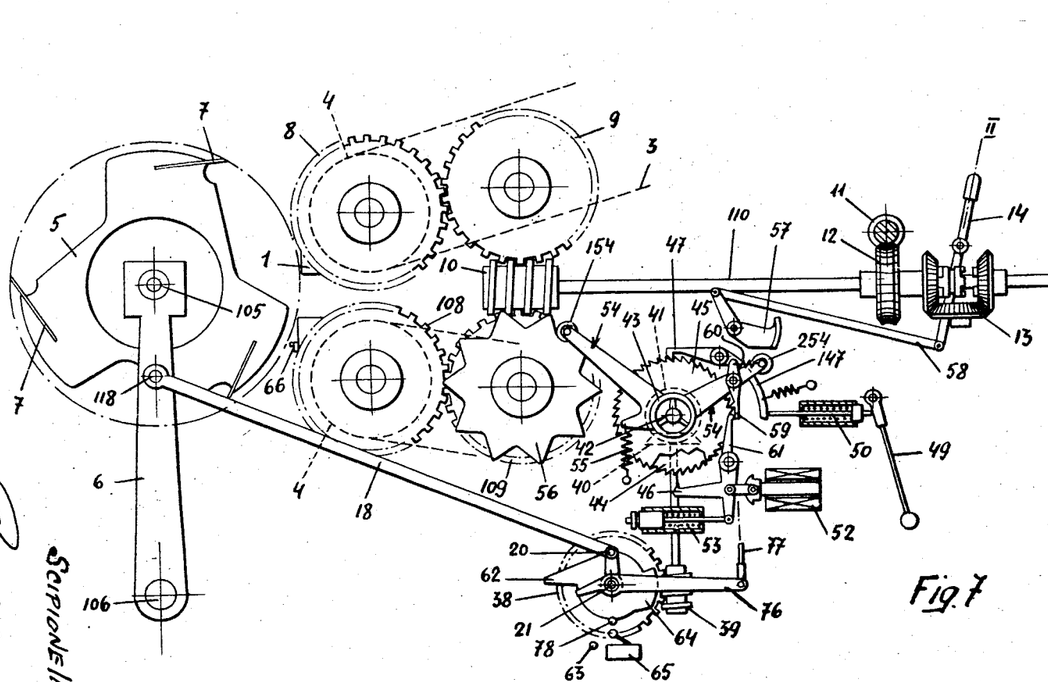
Figures 7 and 8 are two views like Figure 6, but without the electric control circuit and with the cutter head in advancing and in temporary stopping positions.
Figure 8:
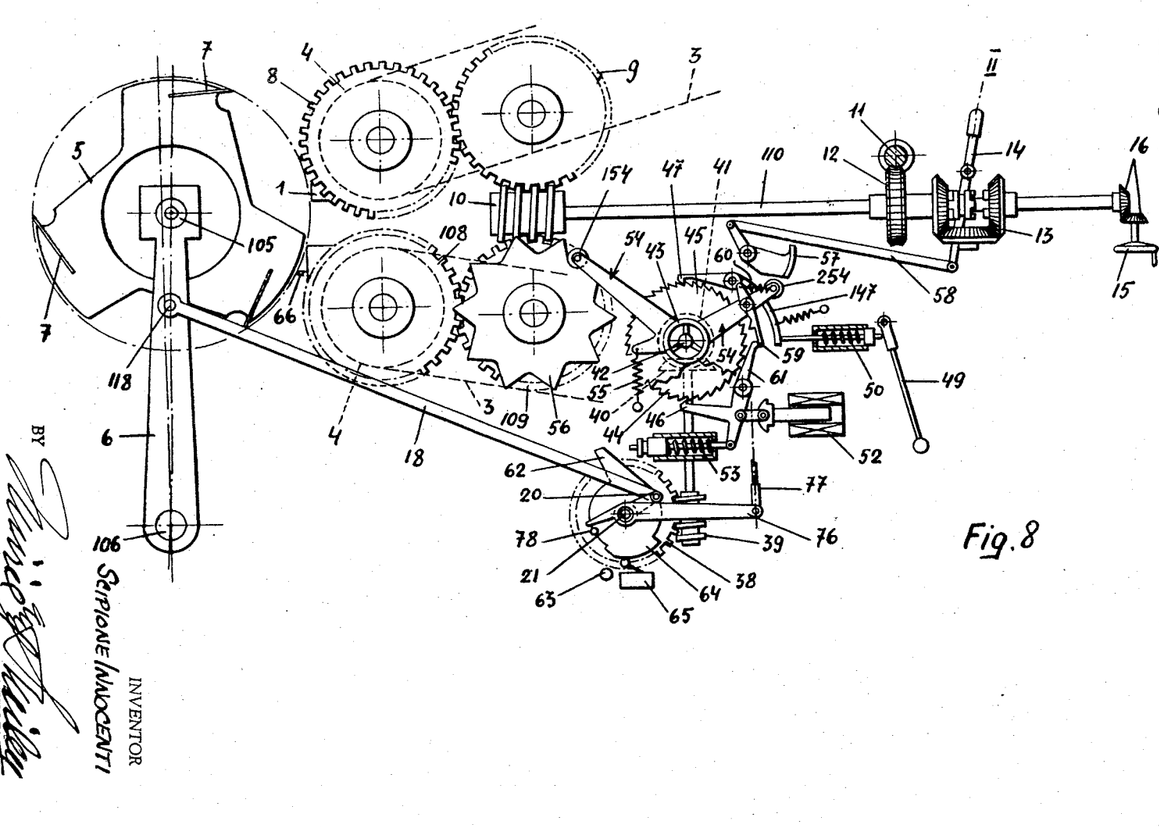

As shown in Figs. 6–8, the rollers 4 are each fixed with a gear 8, 108, respectively, each of which meshes with a gear wheel 9, 109, respectively. The two wheels 9, 109 are mounted on parallel axes and are both driven by a single worm 10 interposed between said gear wheels and mounted on a shaft 110 driven by a motor (not shown) through a step-down worm 11 and wheel 12, the worm wheel 12 of which may be clutched to the shaft 110 through an epicyclic bevel gear 13 provided with a reversing clutch controlled by a lever 14 which has (Fig. 6) a forward position II for forward drive of the belts 3, an idle position I and a reverse position III. The worm 10 may be rotated also by hand by means of a handwheel 15 driving the shaft 110 through a bevel gear pair 16 (Figures 6, 7 and 8).

The rotary cutter head 5 is mounted in front of the mouthpiece 1 on a shaft 105 supported by arms 6 fulcrumed at 106 and capable of swinging towards and away from said mouthpiece 1. In the head 5, knives or cutters 7, extending the length of the head, are clamped so as to project from the supporting head 5, and the whole is so adjusted that the knives, by the rotation of the head, describe a circular path which, on one side is substantially tangential to the outlet of said mouthpiece 1, while, on the opposite side, the knives pass against a grinding wheel 17, extending for the whole knife length, and thus they are kept sharp.

In order to take up the wear of the knives caused by their grinding, the cutter head 5 is slowly moved automatically towards the mouthpiece 1, in the same measure as they are consumed.

To accomplish this, the swinging cutter head-supporting arms 6 are provided with pivot pins 118 to which one end of a pair of links 18 is hinged, the opposite end of which is connected to an eccentric 19 by means of an end collar (Figures 1 and 4) or is hinged to a crank pin 20 (Figure 6) fastened to a shaft 21.

In order to maintain sharpening contact of the cutter head knives 7 with the grinding wheel 17 by compensating the knives wear, in the embodiment as shown in Figure 1, the grinding wheel 17 is carried by two arms 22 fulcrumed at 122 to a slide or threaded sleeve 24 mounted on a threaded shaft 25 provided with a controlling handwheel 26. Said arms are linked to the head-supporting arms 6 by means of a link 23. The length of the arms 22 and the distance between their fulcrum 122 and the hinge points 123 of the link 23 are smaller than the length of the head-carrying arms 6 and than the distance between the fulcrum 106 of the head carrying arms and their hinge point 223 with the link 23, said length and distances being selected in such a manner that when the cutter head 5 is shifted towards and away from the mouthpiece 1 it carries with it the grinding wheel 17 which is thus shifted by a greater distance than the cutter head.

The first adjustment of the grinding wheel into sharpening contact with the knives 7 and its shifting towards or away from the diamond-dressing device is effected by shifting the fulcrum 122 of its supporting arms 22 by means of the handwheel 26.

In the preferred embodiment shown in Figures 2 and 3 the grinding wheel 17 is mounted on a supporting member 28 which is fulcrumed at 128, above the cutter head 5 on a fixed machine part and may be shifted downwardly and upwardly, towards or away from the cutter head 5. On the supporting member 28 a lever 29 is also fulcrumed at 128 the upper end of which is provided with a slot 229 in which a pin 30 is engaged which projects excentrically from a worm wheel 31 which is mounted on the grinding wheel-supporting member 28 and which meshes with a control worm 32. The lever 29 bears with its tail 129 on an upper projection 206 of the arm 6. The grinding wheel 17 is thus maintained by gravity in sharpening contact with the knives 7 by the same swinging arm 6. The length of the grinding wheel-supporting arms 28 and of the cutter head supporting arms 6 and the distance between their fulcrums 128, 106 and the bearing point of the lever 29 on the head-carrying arm 6 are chosen also in this case of such proportional length as to cause the grinding wheel 17 to be shifted towards or away from the mouthpiece by a greater distance than the said cutter head 5. The sharpening contact between the grinding wheel 17 and the cutter head 5 may be adjusted by shifting the pin 30 by means of the worm and worm wheel control 32—31. The diamond-dressing device 27 is disposed above the grinding wheel 17 and the latter is rocked upwardly about its fulcrum 128 in diamond-dressing position, as shown in Figure 3. This upward rocking may be effected for example by means of press piston 33 which is slidably but nonrotatably mounted in a vertical fixed guide 34 and which may be lifted and lowered at will, for example, by means of a screw shaft 35 which may be rotated by a crank 37, for example, through bevel gears 36. The piston 33 may act on a roller 228 fitted on a part of the swinging member 28.

The device which controls the automatic shifting of the cutter head 5 and attached grinding wheel 17 towards the mouthpiece 1 is shown in Figures 4 to 10. The shaft 21, with which the link 18 is coupled, is connected through a worm wheel 38 and worm 39, and through a pair of beveled gears 40, 41 to a control shaft 42 which may be manually rotated by a handwheel 43, Fig. 5. On the control shaft 42 two ratchet wheels 44, 45 are keyed having oppositely inclined teeth which coact with the stopping pawls 46 and 47. The pawl 47 is kept engaged with the corresponding ratchet wheel 45 by a spring 48 and may be lifted therefrom by means of a hand lever 49 which acts on the tail 147 of the pawl through a push rod 50 which is spring biased from the pawl 47. The other pawl 46 is connected with the armature of an electromagnet 52, and is urged into engagement with the corresponding wheel 44 by a spring 53 when the electromagnet 52 is not energized, while it is lifted and disengaged from said wheel when the electromagnet is energized.

By rotating the control shaft 42 in one direction, for example in clockwise direction, the cutter head 5 advances towards the mouth piece 1, and vice-versa. The ratchet wheel 44 prevents the rotation of shaft 42 in clockwise direction and thus prevents the shifting of cutter head 5 towards the mouthpiece 1, and for this reason it will be called "stop-wheel"; while the ratchet wheel 45 prevents the rotation of shaft 42 in anticlockwise direction, and thus it prevents the shifting of cutter head 5 rearwardly and at the same time serves also for determining the rate of shifting of the cutter head towards the mouthpiece 1 and thus it will be called "feed wheel."

A bell-crank lever 54 is idly mounted on the shaft 42 and on one end carries a roller 154 which coacts, under the action of a spring 55, with a multiple cam 56 fixed with one of the conveyor belt-driving gear wheels 9 or 109, shown fixed with the wheel 109. The other end of the lever 54 is provided with a roller 254 which rolls against a rocking sector 57 which is connected through the link 58 to the lever 14 which controls the reverse clutch 13. Thus, when the lever 14 is moved to either of the positions I or III (idle and reverse positions of the clutch, Figures 6 and 10) the lever end 154 is pushed out of contact with the cam 56 whereas when the lever 14 is in position II (Fig. 7) or forward drive position, the sector 57 swings beyond the roller 254 so that the lever 54 is freed and its follower 154 engages the cam 56.

Figures 4, 5:
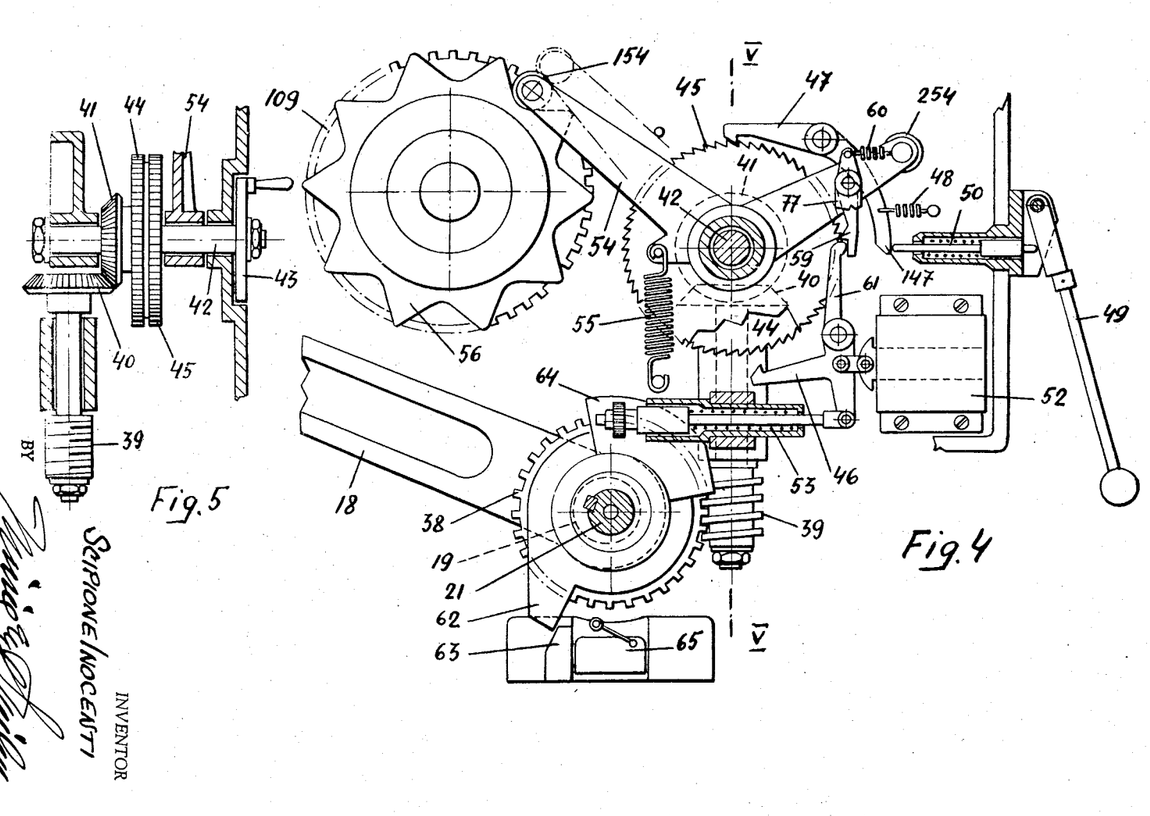
Figure 4 shows the mechanism for the automatic advancing of the rotary cutter head towards the tobacco-discharge mouthpiece.
Figure 5 is a section on line V—V of Figure 4.

On one of the arms of the bell-crank lever 54 a pawl 59 is fulcrumed which drives the feed wheel 45 (as shown in Fig. 4) with which it is brought into engagement by a spring 60. This pawl 59 has a tail portion adapted to be engaged by an arm 61 of a pawl 46 in the position in which the hooked end of the other arm of this latter engages the ratchet teeth of the wheel 44.

On the shaft 21, an arm 62 is keyed which coacts with a stop 63 so as to limit the shifting of the cutter head 5 away from the mouthpiece 1. On the same shaft 21 is also keyed a cam 64 which acts on a switch 65 (Figures 4, 6, 7 and 8) which controls the electric circuit (not shown) of the main motor of the shredding machine.

The above described mechanism for automatically adjusting the position of the cutter head and attached parts with respect to the mouthpiece 1 is controlled by an insulated contact 66 mounted near the said mouthpiece 1 and inserted in the electric circuit which is shown in Figure 6. The insulated contact 66 is connected through a current rectifier 67 with the grid of a gas-filled electronic tube 68 (thyratron), in the anodic circuit of which, which is fed with an alternating current through the transformer 69, is the electromagnet coil 52. Shunted on the rectifier 67 is a resistor 70 having a high ohmic value.

The contact 66 is also connected through another resistor 71, having a low ohmic value, with the cathode of the tube 68 which is maintained at a positive potential of a few volts by a small battery 72 or other source of electric potential. Between the grid of the tube 68 and the ground is a capacitor 73. With the ground is also connected the cutter head 5 by means of a brush 74 sliding on its shaft 105. The rectifier 67 prevents current flow from the contact 66 to the capacitor 73.

The above described control circuit is designed for automatically energizing and de-energizing the electromagnet 52, according to whether the rotary knives 7 do or do not touch the insulated contact 66. In consideration of the short time of contact of each of the knives 7 with the contact 66, and of the weakness of the current passing therethrough, the automatic control circuit is so designed as to accumulate the current pulses generated by the contact of the knives 7 with the contact 66 (and which last for a time of the order of one thousandth of second) thus permitting the electromagnet 52, which is somewhat slower in its action, to be energized or de-energized.

Thus, when the knives 7 do not touch the insulated contact 66, this comes to be of the same positive potential as the cathode of tube 68. On the other hand, the grid of the tube 68 tends to assume the same potential as the contact 66 through the resistor 70, but as a certain time is necessary for this potential be attained, because when the capacitor 73 is charged it generates a voltage drop at the ends of said resistor 70, no current flows through the rectifier 67. When the capacitor 73 is charged, there is no longer a voltage drop at the ends of the resistor 70 and consequently the grid of the tube 68 develops the same potential as the cathode and thus current circulates through the anodic circuit of the tube 68 and the electromagnet 52 is energized.

When one of the knives 7 of the cutter head 5 touches the insulated contact 66, this latter assumes the potential of the ground, but at the grid of the tube 68 is still maintained at a positive potential by the loaded capacitor 73. As however this latter discharges itself through the rectifier 67 (which permits the flow of the current in the direction from the capacitor 73 to the contact 66) and the grid of tube 68 is thus brought to the ground potential, which is negative by a few volts with respect to the cathode, so that the electronic flow through the tube 68 is stopped and the electromagnet 52 is de-energized.

After the revolving knife 7 has left the contact 66, this assumes instantaneously a positive potential, whereas the grid of the tube 68 assumes a positive potential with a certain delay, viz. which is necessary for the capacitor 73 to be charged through the resistor 70, as above described. This delay depends upon the values of the resistor 70 and of the capacitor 73 and is predetermined in such a manner that, if at least one of the knives 7 of the cutter head 5 touches the contact 66 at each revolution of said head, the capacitor 73 is not completely reloaded in the time interval between two successive contacts of the knives, as it is completely discharged each time a knife touches the contact 66. Said delay may be adjusted so as to permit the grid of the tube 68 to resume its positive potential only after a certain time interval corresponding to a plurality of complete revolutions of the cutter head after one of the knives has come into contact with the contact 66.

Figure 9:
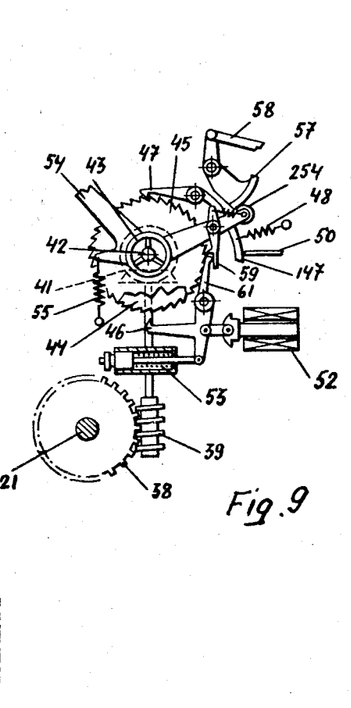
Figures 9 and 10 are detail views of the device for feeding the cutter head towards the tobacco discharge mouthpiece and for manually shifting same away from said mouthpiece.

The operation of the above described device is as follows:

When the machine is stopped and in the position of maximum spacing of the cutter head 5 from the mouthpiece 1 the parts assume the position shown in Figure 6, viz. the lever 14 of the clutch is in idle position so that the roller 154 of the bell-crank lever 54 is clear of its cam 56. The switch 75 of the control circuit is open, the electromagnet 52 is de-energized and the pawl 46 is engaged with its ratchet wheel 44, thus preventing forward movement of the cutter head. The pawl 47 is also engaged with the ratchet wheel 45 and prevents reverse shifting of the cutter head. In order to bring the cutter head 5 into cutting position, close to the mouthpiece 1, it must be shifted by hand, through the handwheel 43, but first it is necessary to start the rotation of the cutter head 5 and to energize the control circuit by closing the switch 75, thus energizing the electromagnet 52, which pulls the pawl 46 from its ratchet wheel 44 and permits the rotation of the shaft 42 in clockwise direction of the said cutter head (Figure 9). The shifting of the cutter head 5 towards the mouthpiece 1 is automatically stopped at the moment in which the revolving knives 7 touch the contact 66, thus de-energizing the electromagnet 52 and allowing the pawl 46 to engage its ratchet wheel 44. In this manner the cutter head 5 is locked in position while the machine is stopped so that it may not be shifted by hand beyond its correct working position with respect to the mouthpiece 1.

In order to attain during the working of the shredding machine the automatic feed of the cutter head 5 towards the mouthpiece 1, it is necessary to start the operation of the conveyor bands 3, which is effected by bringing the lever 14 of the clutch 13 to forward drive position II (Figure 7), in which the sector 57 is disengaged from the bell-crank lever 54 whose end roller 154 engages the cam 56 and promotes the rocking of the shaft 42.

If the revolving knives 7 do not touch the insulated contact 66, the electromagnet 52 is energized and disengages the pawl 46 from its ratchet 44 thus permitting the shaft 42 to revolve in clockwise direction, and the cutter head to advance towards the mouthpiece 1. Also the tail 61 of the pawl 46 is withdrawn from the driving pawl 59, which thus engages the feed wheel 45 and rotates same by one tooth at each rocking of the bell-crank lever 54, thus promoting the micrometric stepwise advancing of the cutter head 5 towards the mouthpiece 1.

The forward shifting of the cutter head is automatically stopped at the moment in which the knives 7 touch the contact 66, thus energizing the electro-magnet 52, and the locking of the ratchet wheel 44 by the pawl 46 whose tail 61 pushes the driving pawl 59 out of contact with the teeth of the wheel 45 (Figure 8). The bell-crank lever roller 154 however remains engaged with the cam 56 which thus rocks the lever 54.

The machine operates as just described as long as one of the knives 7 touches at each revolution of the cutter head the insulated contact 66. As however, when this happens, the movement of the cutter head 5 towards the mouthpiece 1 is stopped and, on the other hand, the grinding wheel continues to sharpen the knives 7 until they are sufficiently ground down so that they no longer touch the insulated contact 66. After a predetermined time from the last contact of the rotary knives 7 with the contact 66, the electromagnet 52 is again energized and the cutter head 5 is again moved stepwise towards the mouthpiece (Fig. 7).

When however the knives are worn out, the cutter head 5 is advanced to the position shown in Fig. 8 and the cam 64, which revolves together with the shaft 21 then opens the switch 65 which cuts the current to the main motor of the shredding machine which is thus stopped. In addition to this electric safety device, a mechanical safety is provided which will be described hereinafter: For this purpose, a double-armed lever 76 is idly fulcrumed on the shaft 21, on arm of which is connected by means of the tie-rod 77 with the rocking lever 54 while the other arm is movable into the path of an abutment member 78 carried by the cam member 62 at such angular position as to abut said arm when the cutter head is close to the mouthpiece 1. During the stepwise advancing of the cutter head, the abutment member 78 moves from the lever 76 which is thus freely rocked by the lever 54. When however the cutter head has reached its end position, if the switch 65 has not been already operated, the abutment 78 comes into the path of the lever 76 and stops same so as to lift the rocking lever 54 out of contact with the cam 56, thus stopping the stepwise advancing of the cutter head.

Figure 10:
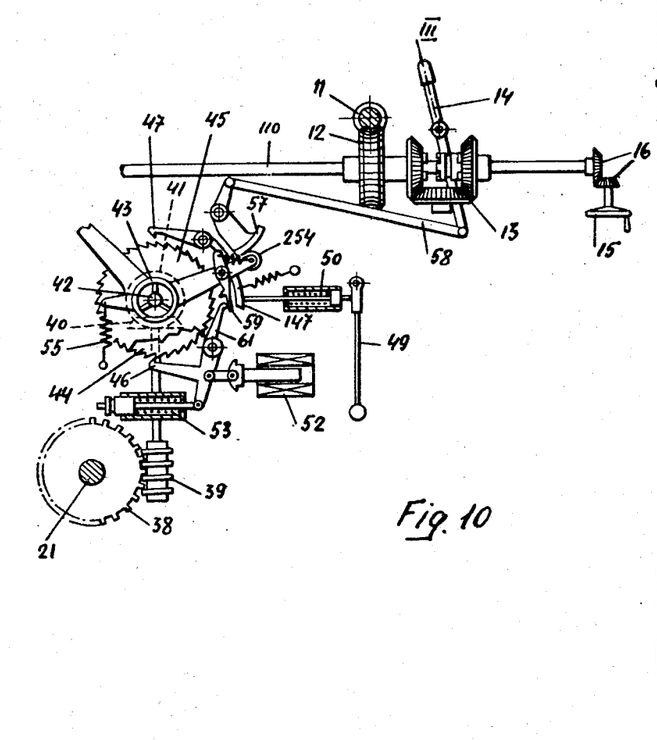

After the machine has been stopped, the cutter head 5 again shifted away from the mouthpiece and brought into the position shown in Figure 6, in order to reinstate the projection of the knives 7 and start the new cutting cycle. This shifting away of the cutter head is effected by hand, by rotating the handwheel 43 in anticlockwise direction, after having unlocked the driving ratchet 45, by lifting its stop pawl 47 by means of the lever 49 (Figure 10).

From the foregoing it is apparent that the advancing of the cutter head for compensating the knife wear due to continuous sharpening it is connected with the operation of the compressor-conveyor unit of the tobacco to be shredded, it is also completely independent therefrom and depends only upon the position of the cutter head with respect to the leaf tobacco discharge mouthpiece.

Of course, the invention is not limited to the embodiments as described and shown. Thus, for example, instead of employing the knives as contact members, separate contact members could be provided on the cutter head adjacent the knives, provided they come to be in the operation area of the grinding wheel and be ground thereby together with the said knives. Furthermore, said movable contacts could be sector-shaped or even ring-shaped and be constituted, for example, by graphite or metal sectors, disks or rings. In this case it is apparent that the electric circuit which is closed by the revolving contact member which contacts with the fixed contact member 66 need not comprise an accumulator of very short electric pulses such as that comprising a capacitor and a resistor in a device in which the electric pulses are given by an instantaneous contact of blade-like members such as the knife edges.

I claim:

1. A machine for cutting leaf tobacco comprising, in combination, a tobacco discharge mouthpiece, means for feeding leaf tobacco in compressed condition to and through said mouthpiece: a rotary cutter head provided with knife means including at least one longitudinal knife projecting from its periphery; supporting means for mounting said cutter head movable as a unit towards and away from said mouthpiece to dispose the path of the revolving knife edge substantially tangentially to said mouthpiece across the leaf tobacco discharged therefrom to slice or shred the leaf of tobacco; a grinding wheel connected to the cutter head supporting means to advance with said cutter head and to maintain a grinding contact with the said revolving knife; means for manually adjusting the position of said cutter head and grinding wheel with respect to said mouthpiece and to each other; means for micro-stepwise advancing said cutter head towards said mouthpiece for taking up the wear of said knife due to grinding and for additionally shifting at the same time said grinding wheel towards said cutter head by amounts substantially corresponding to the wear of said knife to keep a grinding contact therewith, an electric contact arranged in proximity of the discharge end of said mouthpiece an electric circuit including said contact and said kife, and means controlled by said electric circuit for stopping the advancing of said cutter head towards said mouthpiece without stopping its rotation each time the knife carried by said cutter head closes at very short time intervals said electric circuit through said electric contact, whereby the advancing of the said cutter head towards said mouthpiece is again started as soon as said knife ceases to close said electric circuit through said electric contact.

2. A machine for cutting leaf tobacco comprising, in combination, a tobacco discharge mouthpiece, means for feeding leaf tobacco in compressed condition to and through said mouthpiece, a rotary head provided with a plurality of longitudinal knives projecting from its periphery: supporting means for mounting said head movable as a unit towards and away from said mouthpiece to dispose the path of the knife edges substantially tangentially to said mouthpiece across the leaf tobacco discharged therefrom to slice or shred the leaf tobacco; a grinding wheel connected to the cutter head supporting means to advance with said cutter head and maintain a grinding contact with said revolving knives; means for manually adjusting the position of said cutter head and grinding wheel with respect to said mouthpiece and to each other; means for micro-stepwise advancing said cutter head towards said mouthpiece to take up the wear of said knives due to grinding and for additionally shifting at the same time said grinding wheel towards the said cutter head by amount substantially corresponding to the wear of said knives and thus keep a grinding contact therewith, an electric contact arranged in proximity of the discharge end of said mouthpiece, an electric circuit including said contact and said knives, and means controlled by said electric circuit for stopping the advancing of said cutter head towards said mouthpiece without stopping its rotation each time the knives carried by said cutter head close at very short time intervals said electric circuit through said electric contact, whereby the advancing of the said cutter head towards said mouthpiece is again started as soon as said knives cease to close said electric circuit through said electric contact.

3. A machine for cutting leaf tobacco comprising, in combination, a tobacco discharge mouthpiece, a pair of conveyor belts converging towards said mouthpiece for feeding leaf tobacco in compressed condition to and through said mouthpiece, a rotary head provided with a number of longitudinal knives projecting in equally spaced relation from its periphery; supporting means for mounting said head movable as a unit towards and away from said mouthpiece to dispose the path of the knife edges substantially tangentially to said mouthpiece across the leaf tobacco discharged therefrom to slice or shred the tobacco; a grinding wheel connected to the cutter head supporting means to advance together with said cutter head and maintain a grinding contact with said revolving knives; means for manually adjusting the position of said cutter head and grinding wheel with respect to said mouthpiece and to each other; means for micro-stepwise advancing said cutter head and grinding wheel towards said mouthpiece for taking up the wear of said knives due to grinding; an electric circuit including at least one insulated electric contact arranged in proximity of the discharge end of said mouthpiece and contact members engageable with said insulated contact and mounted on said cutter head to be ground by said grinding wheel, means controlled by said electric circuit for stopping the advancing of said cutter head towards said mouthpiece without stopping its rotation or interrupting the grinding contact each time said cutter head contact members close at very short time intervals said electric circuit through said insulated electric contact, and means for again starting advancing of said cutter head towards the said mouthpiece as soon as the said contact members are ground down and cease to close for a predetermined time said electric circuit through said insulated electric contact.

4. A machine according to claim 1, in which said cutter head and grinding wheel supporting means comprises a pair of cutter head supporting arms pivotally mounted at one end and carrying the rotatable cutter head at the other end, an excentric member rotatably mounted at one side of the hinge pivot member of said cutter head carrying arms, a link connecting said cutter head carrying arms and said excentric member, means for micro-stepwise rotating said excentric member by not more than one-half of a complete revolution during a full advancing of said cutter head towards said mouthpiece; a linearly shiftable supporting member mounted at the opposite side of said supporting pivot of said cutter head carrying arms, means for manually shifting said shiftable supporting member, hinge pivots carried by said shiftable member, a pair of arms pivoted on said last named pivots, a grinding wheel extending the length of the cutter head knife means and rotatably mounted at the free ends of said last named arms, and a link connecting said grinding wheel carrying arms to said cutter head carrying arms, said link being pivoted to both said arms in such a position that when the grinding wheel is drawn towards said mouthpiece by said excentric link by a certain amount said grinding wheel is shifted towards the said cutter head by such an additional distance as to keep a grinding contact therewith.

5. A machine according to claim 1 in which said cutter head and grinding wheel supporting means comprises a pair of cutter head supporting arms pivotally mounted at one end and carrying the rotatable cutter head at the other end, an excentric member rotatably mounted at one side of the hinge pivot member of said cutter head carrying arms, a link connecting said cutter head carrying arms and said excentric member, means for micro-stepwise rotating said excentric member by not more than one-half of a complete revolution during a full advancing of said cutter head towards said mouthpiece; a linearly shiftable supporting member mounted at the opposite side of said supporting pivot of said cutter head carrying arms, means for manually shifting said shiftable supporting member, hinge pivots carried by said shiftable member, a pair of arms pivoted on said last named pivots, a grinding wheel extending the length of the cutter head knife means and rotatably mounted at the free ends of said last named arms a link connecting said grinding wheel carrying arms to said cutter head carrying arms, said link being pivoted to both said arms in such a position that when the grinding wheel is drawn towards said mouthpiece by said excentric link by a certain amount, said grinding wheel is shifted towards the said cutter head by such an additional distance as to keep a grinding contact therewith, and a dressing diamond mounted in proximity of the grinding wheel, at the side opposite to the said cutter head; whereby upon shifting said shiftable grinding wheel supporting member in one direction the grinding wheel may be adjusted with respect to said rotary cutter head, while by shifting said wheel in the opposite direction it is brought into dressing contact with said dressing diamond.

6. A machine according to claim 1, in which said cutter head and grinding wheel supporting means comprises a pair of cutter head supporting arms pivotally mounted at one end and carrying the rotatable cutter head at the other end, an excentric member rotatably mounted at one side of the hinge pivot member of said cutter head carrying arms, a connecting rod connecting said cutter head carrying arms and said excentric member, means for micro-stepwise rotating said excentric member; a grinding wheel supporting member fulcrumed on a fixed machine part above said cutter head, a grinding wheel extending the length of the cutter head knife means and fastened to said supporting member to gravitate into the path of the revolving knife means, a double-armed lever hinged on the same fulcrum as said supporting member, an abutment member on one of said lever arms and abutting said cutter head supporting arms, and means on said grinding wheel supporting member for adjusting the angular position of said double armed lever to maintain said grinding wheel in grinding contact with the knife means of said cutter head.

7. A machine according to claim 1, in which said cutter head and grinding wheel supporting means comprises a pair of cutter head supporting arms pivotally mounted at one end and carrying the rotatable cutter head at the other end, an excentric member rotatably mounted at one side of the hinge pivot member of said cutter head carrying arms, a connecting rod connecting said cutter head carrying arms and said excentric member, means for micro-stepwise rotating said excentric member; a grinding wheel supporting member fulcrumed on a fixed machine part above said cutter head, a grinding wheel extending the length of the cutter head knife means and fastened to said supporting member to gravitate into the path of the revolving knife means, a double-armed lever hinged on the same fulcrum as said supporting member, an abutment member on one of said lever arms and abutting said cutter head supporting arms, and means on said grinding wheel supporting member for adjusting the angular position of said double armed lever to maintain said grinding wheel in grinding contact with the knife means of said cutter head, and said means for adjusting the said grinding wheel with respect to the cutter head comprising a slot formed in the arm opposite said lever arm carrying said abutment member, a crank pin fulcrumed on said grinding wheel supporting members and engaging in said slot, and means for revolving said crank pin and adjusting the position of said abutment member carrying lever.

8. A machine according to claim 1, in which said cutter head and grinding wheel supporting means comprises a pair of cutter head supporting arms pivotally mounted at one end and carrying the rotatable cutter head at the other end, an excentric member rotatably mounted at one side of the hinge pivot member of said cutter head carrying arms, a connecting rod connecting said cutter head carrying arms and said excentric member, means for micro-stepwise rotating said excentric member; a grinding wheel supporting member fulcrumed on a fixed machine part above said cutter head, a grinding wheel extending the length of the cutter head knife means and fastened to said supporting member to gravitate into the path of the revolving knife means, a double-armed lever hinged on the same fulcrum as said supporting member, an abutment member on one of said lever arms and abutting said cutter head supporting arms, and means on said grinding wheel supporting member for adjusting the angular position of said double armed lever to maintain said grinding wheel in grinding contact with the knife means of said cutter head; and a diamond-dressing device above said grinding wheel, means for adjusting the position of said diamond dressing device with respect to said grinding wheel, and means for shifting said grinding wheel out of contact with said cutter head and into dressing contact with said diamond.

9. A machine according to claim 1, in which said cutter head is carried at one end of a pair of arms, the other end of which is hinged to a fixed machine part; members connecting said arms to the grinding wheel supporting member to cause said grinding wheel to keep grinding contact with the cutter head knife means, an excentric member mounted on the mouthpiece side of said cutter head, a link connecting a part of said cutter head supporting arms with said excentric member, means for micro-stepwise driving said excentric member in the direction of said mouthpiece in timed relaton with the feed means of the leaf tobacco to said mouthpiece, and means for stopping the micro-stepwise rotation of said excentric member in the direction in which it pulls said cutter head towards said mouthpiece when said electric circuit is closed through said contact in proximity of said mouthpiece.

10. A machine according to claim 1, in which said cutter head is carried at one end of a pair of arms, the other end of which is hinged to a fixed machine part; members connecting said arms to the grinding wheel supporting member to cause said grinding wheel to keep grinding contact with the cutter head knife means, an excentric member mounted on the mouthpiece side of said cutter head, a link connecting a part of said cutter head supporting arms with said excentric member, means for micro-stepwise driving said excentric member in the direction of said mouthpiece in timed relation with the feed means of the leaf tobacco to said mouthpiece, and means for stopping the micro-stepwise rotation of said excentric member in the direction in which it pulls said cutter head towards said mouthpiece when said electric circuit is closed through said contact in proximity of said mouthpiece; said last named means comprising an electromagnet energized by said electric circuit, an armature for said electromagnet, said micro-stepwise advancing means comprising ratchet wheels provided with a driving pawl and a stop pawl, means connecting said stop pawl to the armature of said electromagnet, and means connecting said stop pawl with said driving pawl, whereby energization of the electromagnet operates said stop pawl to stop the excentric member driving ratchet wheel and at the same time to disengage said ratchet wheel from its driving means.

11. A device according to claim 1, in which said electric circuit comprises a source of electric alternating current, a relay having an armature acting on said means for micro-stepwise advancing said cutter head and for stopping said advancing when said relay is energized, an electronic tube having an anode, a grid and a cathode, a lead connecting said anode with said relay and with said source of alternating current, means connecting said grid with one armature of a capacitor, a lead connecting the other armature of said capacitor to the ground; means connecting also said grid with the other terminal of said source of alternating current through a resistor and a current rectifier in parallel; a first resistor and a rectifier connected in parallel between them and through a second resistor with the cathode of said electronic tube, and a source of low voltage electric potential connected by its positive pole to said cathode, said source of electric potential being inserted between the connecting point of said second named resistor and the ground, said rectifier permitting the flow of the electric current only in the direction of the insulated capacitor terminal, the whole being arranged in such a manner that the resistors and capacitor constitute a time base relay which is so adjusted as to permit the current flow through the electronic tube and the consequent energizing of the said relay only if the time of loadings of said capacitor, as a consequence of the closures of said electric circuit through said contact in proximity of said mouthpiece imparts to said tube grid such a potential as to allow the flow through said tube of an anodic current which is sufficiently strong as to energize said relay and actuate its armature, said armature operatively being connected to the stop means of the device for advancing said cutter head towards said mouthpiece to stop the advancing of said cutter head upon actuation of said armature.

References Cited in the file of this patent

UNITED STATES PATENTS

| | | |
|---|---|---|
| 2,763,307 | Schreiber | Sept. 18, 1956 |

FOREIGN PATENTS

| | | |
|---|---|---|
| 733,536 | Great Britain | July 13, 1955 |